March 11, 1969 — H. P. O. UNGER — 3,432,275
DISPLAY SLIDE FOR WET BIOLOGICAL PREPARATES
Filed Aug. 26, 1965
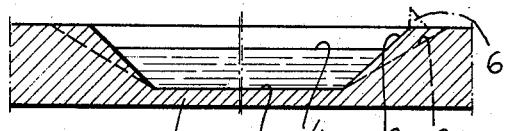
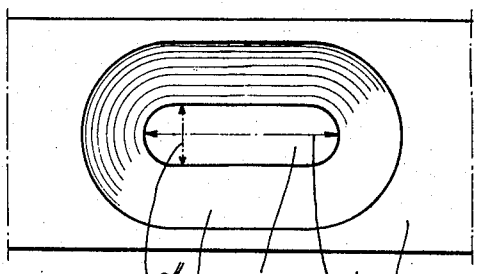
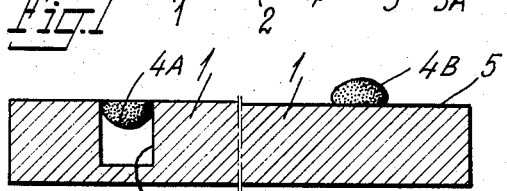
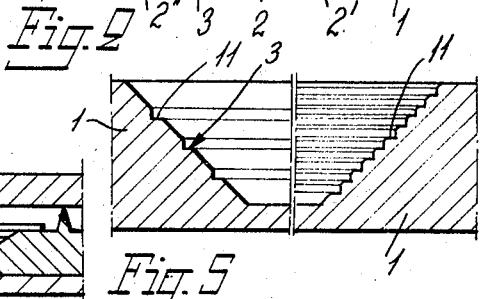
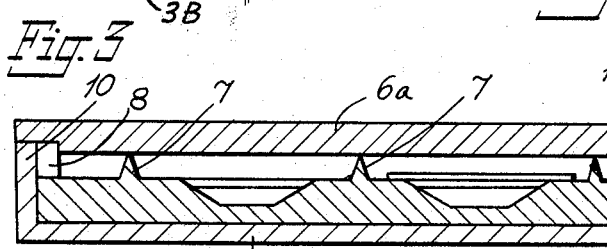
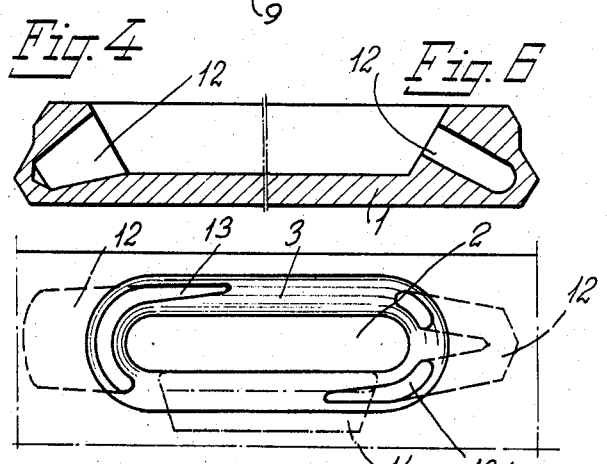
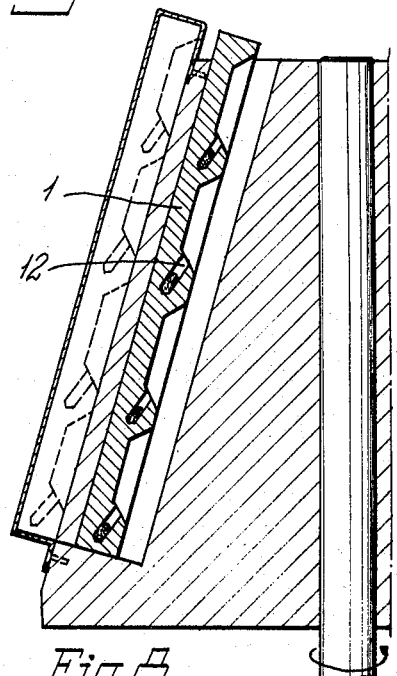
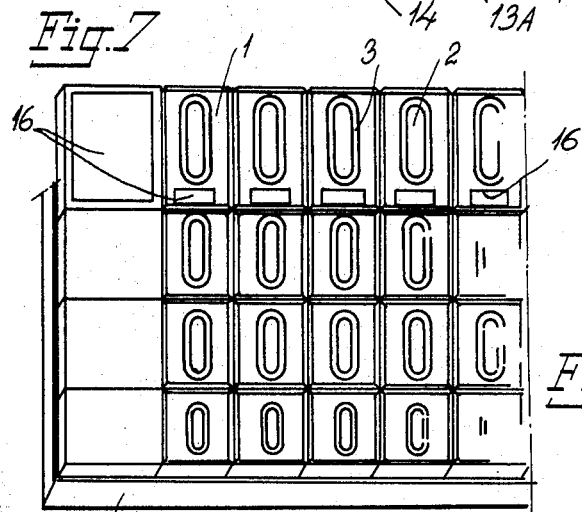
INVENTOR
HANS PETER OLOF UNGER
BY Roy E. Betherbridge
ATTORNEY March 11, 1969     H. P. O. UNGER     3,432,275
DISPLAY SLIDE FOR WET BIOLOGICAL PREPARATES
Filed Aug. 26, 1965     Sheet 2 of 3
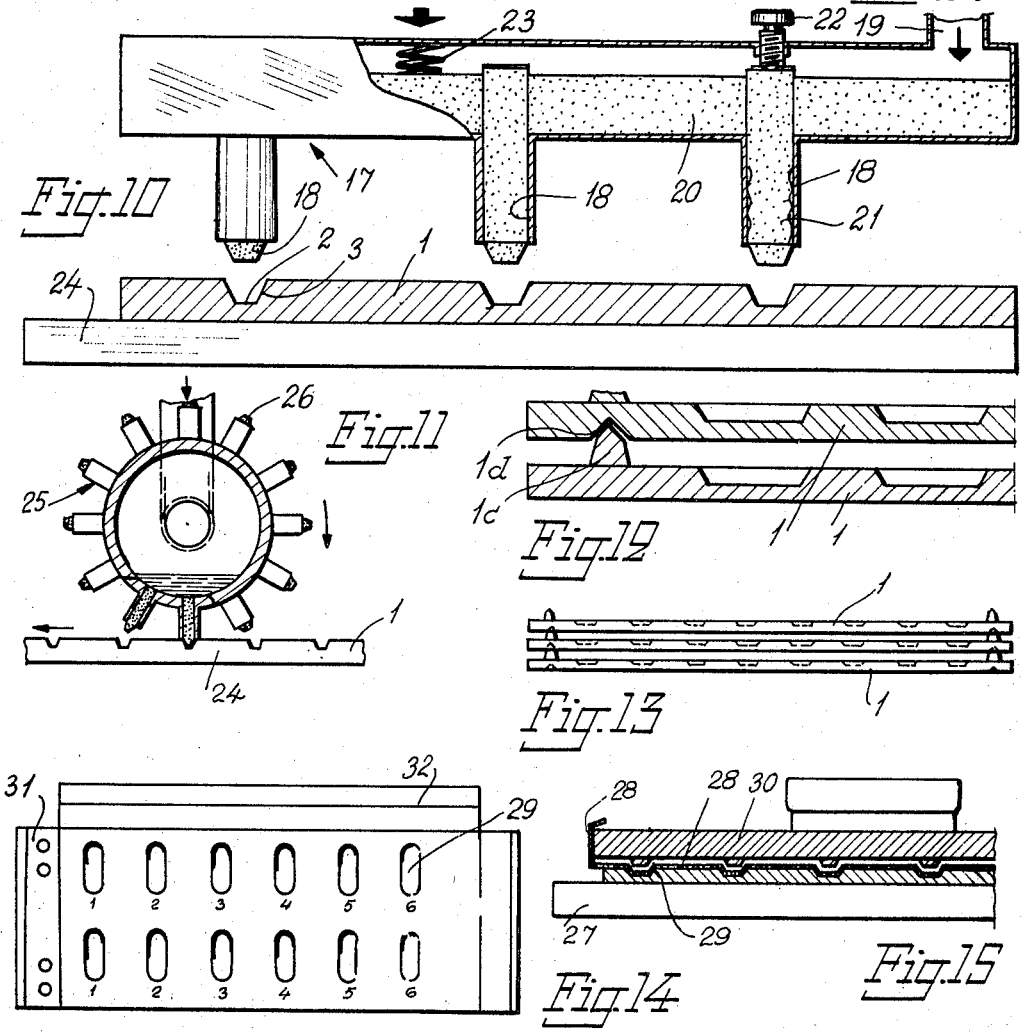
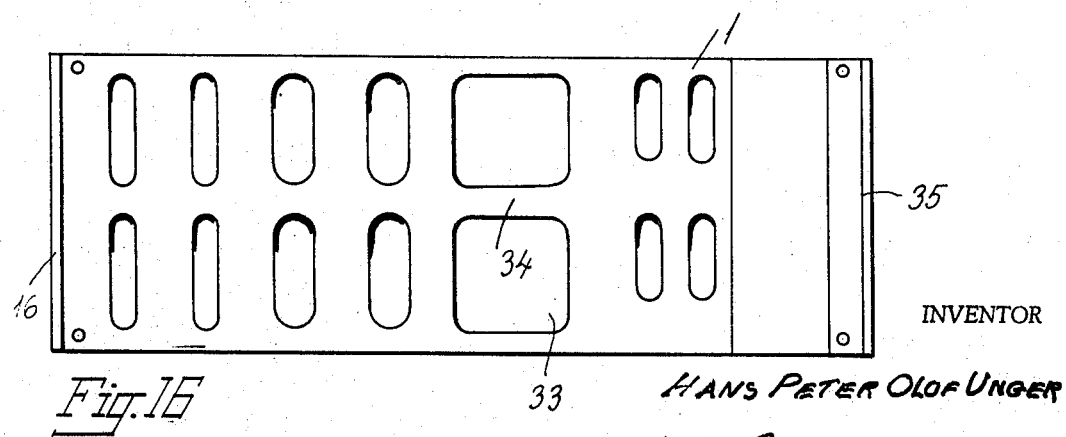
INVENTOR
HANS PETER OLOF UNGER
BY Roy E. Pethebridge
ATTORNEY March 11, 1969     H. P. O. UNGER     3,432,275
DISPLAY SLIDE FOR WET BIOLOGICAL PREPARATES
Filed Aug. 26, 1965     Sheet 3 of 3

INVENTOR
HANS PETER OLOF UNGER
BY Roy E. Petherbridge
ATTORNEY

United States Patent Office 3,432,275
Patented Mar. 11, 1969

3,432,275
DISPLAY SLIDE FOR WET BIOLOGICAL PREPARATES
Hans Peter Olof Unger, 57 Skeppargatan, Stockholm, Sweden
Filed Aug. 26, 1965, Ser. No. 482,871
Claims priority, application Sweden, Aug. 31, 1964, 10,430/64
U.S. Cl. 23—292      5 Claims
Int. Cl. B01l 3/00

ABSTRACT OF THE DISCLOSURE

A slide for testing or examining biological preparations, e.g., for blood typing. The slide consists of a plate made of a plastic material and provided with one or more shallow elongated recesses for the preparations. The inherently hydrophobic surfaces of the recesses are coated with a hydrophilic substance selected from the group consisting of polysorbates, polyvinyl-2-pyrrolidone and certain types of polyglycols or alkanediols.

---

This invention relates to a display slide for wet biological preparates, such as blood, although the invention is not so limited it will be discussed below, for convenience, with reference essentially to blood typing slides but it should be understood that it is applicable to all kinds of slides used in the medical or laboratory fields.

A plurality of slides of glass, ceramic materials and plastic materials have been proposed previously. However, although such slides are comparatively cheap and have certain advantages in their respective fields of use, they have been found to suffer from one or more of the following shortcomings, viz.:

(a) Bad flow characteristics due to a more or less hydrophobical surface;
(b) Flooding of the preparate, particularly on agitation;
(c) Bad optical properties at microscopical inspection of the preparate, due to an arcuate liquid surface;
(d) Money and personnel consuming cleaning of the slides if not of the disposable type;
(e) To quicken a drying of the preparate due to a great surface evaporation.

The display slide according to the present invention has been designed so as to remedy the above recited shortcomings.

To the just mentioned end, the slide according to the present invention comprises a plate, preferably of a transparent material, which plate has a plurality of recesses to receive the preparate, and the characterizing features of said slide is that each recess is elongated and has outwardly slanting walls, and that the surface of the slide surrounding the recesses is hydrophobic whereas the entire surface of each recess is hydrophilic.

Other characterizing features will in part be evident and in part pointed out specifically as the description proceeds with reference to the accompanying drawings in which a few embodiments are illustrated as nonlimiting examples of the display slide and of the method of making as well as utilizing the same.

Figure 17:
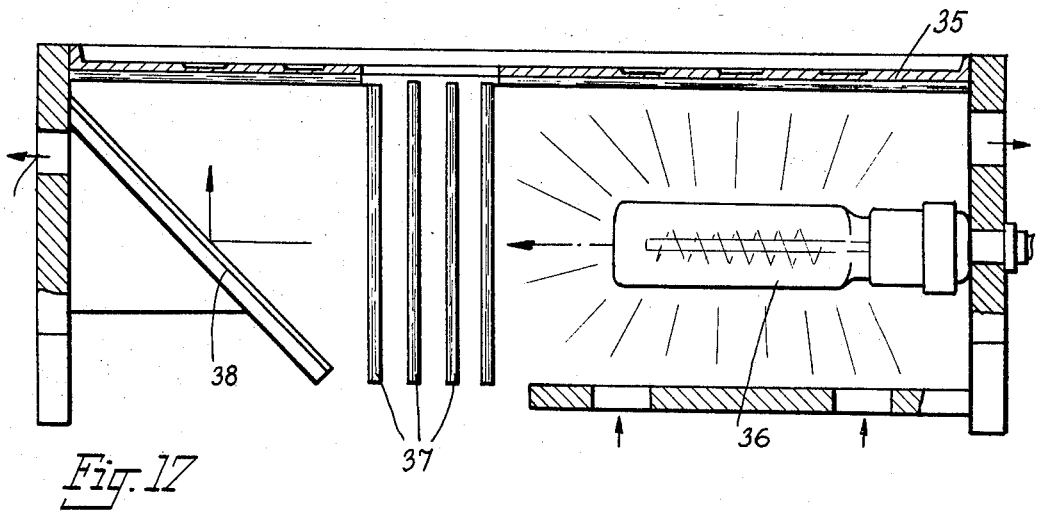
Figure 18:
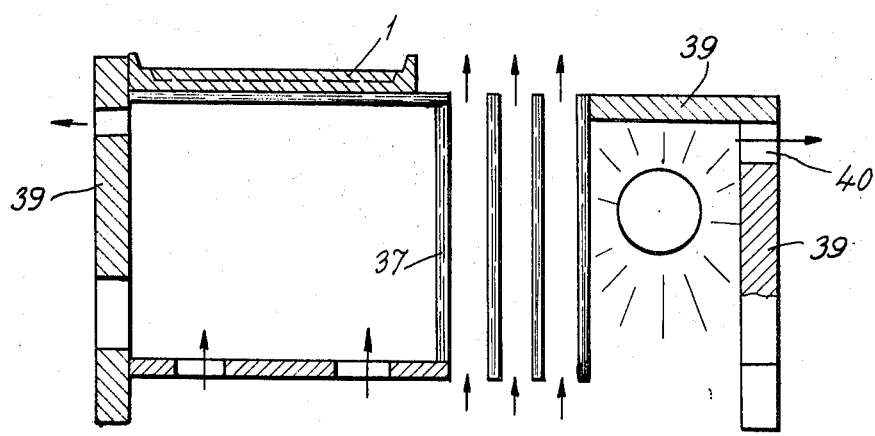

FIGURE 1 is a part sectional view of one embodiment of a slide according to the invention;
FIGURE 2 is a plan view corresponding to FIGURE 1;
FIGURE 3 is a part sectional view as in FIGURE 1 and will be utilized for explanation purposes;
FIGURE 4 is a part sectional view of a second embodiment of the slide;

FIGURES 5 and 6 are part sectional views of a third and a fourth embodiment of the slide according to the invention;
FIGURE 7 is a plan view corresponding to FIGURE 6;
FIGURE 8 is a part sectional view, illustrating in a very diagrammatic manner a portion of a centrifuge head wherein a slide according to the invention has been inserted;
FIGURE 9 is a plan view of a slide having a plurality of recesses of different sizes;
FIGURES 10 and 11 illustrate two different methods of preparing a slide according to the invention;
FIGURES 12 and 13 show an arrangement to enable stacking and a stack or pile of slides, respectively;
FIGURES 14 and 15 illustrate a filter arrangement in a part sectional view and plan view, respectively;
FIGURES 16, 17 and 18 illustrate certain proposals in relation to the utilization of the slide according to the invention in actual practice.

In the drawings there is shown a slide 1, preferably made of a transparent material, such as a plastic material, and having a plurality of depressed or machined recesses of which only one is shown. Each recess is elongated and has a flat bottom 2. Preferably, the ends of each recess are semicircular as shown in FIGURE 2. The outwardly slanting side walls of each recess may be arranged to include different angles with a horizontal plane, such as exemplified by the side walls 3 and 3A, respectively. These included angles have to be chosen suitably in dependence of the surface properties of the preparate fluid and the surface tension.

The slanting disposition of the side walls in relation to the horizontal plane brings about a flattening of the liquid surface 4 in the recess due to a correcting of the adherence angle where the liquid surface 4 contacts the wall 3, and this independent of the degree of filling of the recess within the volumetric capacity thereof. This is illustrated by the plane horizontal run of the liquid surface 4 in FIGURE 1. Obviously, such plane liquid surfaces facilitate a macroscopical observation of the preparate and enable a clear microscopical examination of the whole preparate, short of optical refraction errors due to an arcuate liquid surface.

FIGURE 3 illustrates schematically in cross section the arcuate liquid surfaces 4A and 4B, respectively, formed on one hand in a recess having vertical side walls 3B, and, on the other hand, the extreme opposite thereto, viz., a plane, horizontal surface 5. The plane outwardly slanting wall 3 in FIGURE 1 would define a mean condition wherein the oppositely arcuating tendencies as exemplified by the surfaces 4B and 5, respectively, balance each other.

In FIGURE 1 there is further shown an optional uppermost border 6 of the recess, viz., in the shape of a sharp edge slightly elevated above the upper surface of the slide 1.

FIGURE 2 is particularly intended to show the elongated shape of the recess, having a major axis 2' and a minor axis 2" which design permits a very effective mixing of the preparate on manual or mechanical agitation or rocking of the slide 1. Preferably the ratio 2' to 2" is about 4 to 1. Obviously such an effective mixing could not be obtained with square, oval or round recesses as the liquid therein would not be compelled to move that unidirectionally forth and back as is the case with the design according to FIGURE 2.

Furthermore, the slanting side walls 3 may be restricted to the longer sides only of the recess, whereas at the end portions the walls may run vertically down to the plane bottom 2 or may slant inwardly. This feature may in certain cases further reduce the danger of flooding of the preparate on a strong agitation.

Evaporation and attendant variations of the concentration, even to the extent of a complete drying of the wet preparate, has been noticed to be considerably reduced when a slide of this improved type is utilized which is attributed to the fact that the relation between the exposed liquid surface 4 and the liquid volume is now much reduced as compared to that with previous slides.

The evaporation may be further reduced by enclosing the recess space by means of a cover 6, see FIGURE 4, which cover may take the shape of a plane transparent plate. The cover 6 may rest either on ribs 7 on the slide 1 or directly on the slide 1. In the latter case the cover may have a marginal bead 8 on the under surface thereof which bead 8 may be of such a height that the cover is held clear of the upper edges of the ribs 7. As a further alternative, the cover may rest on a support pan 9 with a marginal border 10 in which case one or a plurality of slides are supported within the pan. Still further, the cover may be of a smaller size and rest on the upper surface of the slide to overlap and cover the totally filled recess.

It will be easily realized that the just disclosed features serve to reduce the air space above the recess and thus to considerably reduce the evaporation for which reason incubation and inspection of the preparate for long extended periods is made possible.

In FIGURE 5 there are disclosed in cross-section two modified designs of the side wall 3 of the recess. Thus, in either one of these cases the side wall has a greater or smaller number of depressed or machined small platforms 11 which—with a given filling degree—would ensure not only a plane horizontal liquid surface 5 but moreover a horizontally even and straight line of contact between the liquid and the side wall.

In connection with several laboratory operations the preparates have to be strongly agitated or centrifuged prior to further operations therewith which—particularly as far as small quantities are concerned (such as expensive antiserums)—may be cumbersome and time consuming if carried out manually, or which makes it necessary to work with greater quantities than are strictly required for the operation proper. To remedy this drawback the modified design as illustrated in FIGURES 6 and 7 has been provided. In this design the end portions of the recess have been provided with pockets 12 which extend outwardly from the end portions adjacent the bottom 2 and which may slope downwardly. As shown these pockets may be of different shapes, depending on the width of the recess, the shape of the side walls 3 and the thickness of the slide 1. On one side the pocket 12 may have an extension 13 which merges smoothly with the side wall 3 of the recess. As set forth in FIGURE 7 the pocket 12 may also be of an arcuate, channel shape. The axes of the channel portions form an acute angle with each other, and the portions may be of different depths and diameters. Further, one of the portions may be designed with an extension 13A which merges smoothly with the side wall 3. Further, as is shown in FIGURE 7, it would also be possible to design the side wall 3 of the recess with a pocket 14.

The just described pockets 12 have been found to fulfill two important functions. Firstly, wet preparates in a recess of this type may be agitated very strongly, either manually or mechanically, without the preparate flowing out of the recess, which is attributed to the fact that the preparate flows over the bottom 2 alternatingly into two similar pockets 12 at the end portions of the recess or into the pocket 14 along the longer side wall of the recess.

Secondly, the pockets operate as preparate containers during centrifugation, in which case one of the pockets is loaded with the preparate following which the slide is placed in correct position within or on to a centrifuge head of a conventional type, compare FIGURE 8. Then, with or without an intermediary agitation of the slide, the preparate may be emptied out of the pocket to flow out into the recess through the pocket extension 10 and to cover the bottom 2 of the recess as the slide is placed horizontally. In this way also small quantities may be centifugated and displayed on one and the same slide without separate manipulations.

In FIGURE 9 there is shown a slide having a plurality of recesses arranged in rows of different sizes. This possibility of making the recesses in greater or smaller sizes is particularly advantageous when it comes to small preparates or liquid volumes which may be rare or very expensive. Thus, for instance, if very expensive antiserums are used in some microoperations, a very considerable saving may be reached in bigger laboratories where the consumption of such antiserums is otherwise rather great. Naturally, it would also be possible to compose the slide according to FIGURE 9 of a plurality of plates of the same sizes or of different sizes, each one with either one or, for example, ten recesses in a row, and removably placed on a pan 15. This type is particularly advantageous in connection with greater series of preparates and may have a continuous denomination of the recesses as well as special areas 16 for preformed reference signs or for noticing preparate types etc.

In actual practice it has been ascertained that it is essential to provide for areas of hydrophilic character on the surface of the otherwise hydrophobic plastic material of which the slides are preferably made. These hydrophilic surface areas have to be permanent on storing the slides, and, in particular, they have to meet the requirement of not influencing the reactions within the recesses in any way, say in an inhibitating or accelerating sense, or by causing cell damages. Research work has revealed that the substance commercially available under the trademark TWEEN 80 (Polysorbate 80) would meet these requirements excellently. This substance may be mixed with alcohol to the desired concentration, and may thus be made thin-flowing. An applied film of this substance affords an excellent hydrophilic surface. Further particulars with respect to suitable coatings are given below. One method of applying the TWEEN 80 (Polysorbate 80) coating is illustrated schematically in FIGURE 10. In this figure there is shown a stamp head 17 having individual stamps 18 in alignment with the individual recesses. The head 17 which is adapted to move downwardly in its stamping stroke is provided with an inlet 19 for the TWEEN 80 (Polysorbate 80) substance, mixed with ethylalcohol, for instance, to the desired concentration. This liquid mixture is absorbed in a fibrous pad 20 and passes on to a stamp pad 21 adjustably disposed in a support sleeve. The sleeve is adjustable into various altitudes by means of a screw 22 which passes through a pressure plate held on to the upper surface of the pad 20 by means of a spring 23. The slide 1 which is to be provided with coatings is disposed on a base plate 24.

In FIGURE 11 there is disclosed another method of preparing wherein there is used a rotary stamping wheel 25, with individual stamps 26 having their stamping pads arranged so as to be able to enter into the recesses of the slide. In this case the wheel may be driven to cause a corresponding sliding motion of the base plate 24 or, alternatively, may the base plate 24 be horizontally moved to cause a corresponding rotation of the stamping wheel in contact therewith; naturally, in the latter case the stamping wheel would be freely rotatably journalled.

FIGURE 12 illustrates centering pins 1C on the upper surface of one slide and corresponding tapering recesses 1D on the under surface of the another slide to enable stacking of the slides in fixed relationship; FIGURE 13 shows a stack or pile of such slides.

In some cases it may be of interest to be able to store the results of the reactions that have taken place in the recesses, such as for documentation and subsequent checking purposes. To this end a special filter panel has been designed. This filter panel may be selectively preparated on predetermined areas in the same way as has been described with reference to the slide. The function of the filter panel is to absorb the substance in the recesses of the slide, which takes place very quickly as the filter panel is brought into contact with the slide. Then, the preparate is permitted to dry up on the filter panel for recording and reference purposes, and to facilitate the task of referring back the filter panel may be provided with reference characters and signs corresponding to those of the slide.

FIGURE 15 shows in section a pan 27 carrying a slide 1 with a plurality of recesses wherein a reaction such as a blood group determination, has been carried out. The just mentioned filter panel 28 which may be designed so as to adapt its shape to that of the recesses of the slide is placed on to the slide and the preformed embossments 29 enter into the said recesses to absorb the preparates therein. The filter panel is manipulated by means of a template 30, and is also brought into intimate contact with slide by means of this template.

FIGURE 14 illustrates the filter panel 28 from above and shows clearly the preformed embossments 29 corresponding to the recesses of the slide. As shown these embossments have been designated by 1, 2, 3, etc. Further, this figure shows that the filter panel is provided with additional side flaps 31, 32 which facilitate the fastening of the filter panel on to the template and which may be provided with holes to permit docketing of the whole panel for recording.

FIGURE 16 shows still another modification of the slide which—on the left hand portion thereof—permits reactions short of heat admission, solely under inspection with light passing through the slide from below. On the right hand portion of the slide there is obtained, besides the light from below, also a simultaneous heating of this slide portion. Thus, the last mentioned portion is particularly suited to be used in connection with reactions that require a predetermined temperature for optimum results. It will be easily realized by those skilled in the art that this slide is particularly well adapted for use in connection with various serological reactions, such as with respect to human blood samples, which require the +20 and +37 type of reaction, respectively. To enable such reactions on one and the same slide, thereby excluding the possibility of confusions by using different slides, the slide has been provided with a central ventilation opening 33, if desired with a reinforcing cross rib 34. This slide is placed on a special inspection frame to enable reactions at the different optimum temperatures, such as shown by the slide 35 in FIGURE 17. Characterizing features of the inspection frame are a heat emitting source of light 36, and insulating and heat conveying vertical transparent plates 37. The plates let through the light but prevent passage of the heat as they are ventilated by the air admitted from below and flowing off upwardly. The slightly heated air flows off upwardly through the opening 33 in the slide 35, and is thus prevented from heating the slide to any noticeable extent. The light passes the plates 37 and is reflected upwardly through the slide by means of an inclined mirror 38.

FIGURE 18 shows another type of inspection frame where the heat from the source of light is likewise drawn off by means of vertical transparent plates 37 along which an upwardly directed flow of cooling air or liquid may be passed to increase the withdrawal of heat. The surface portions 39 are dark and nontranslucent. Further, to draw off excess or impermissible heat the light source space is vented from below and upwardly through an outlet opening 40.

The described slide is designed in a manner to permit manufacture by extrusion from a suitable plastic material to make it suitable for use as a disposable type of slide.

It has been mentioned above that polysorbate 80 is a suitable material for making selected surface areas hydrophilic. This substance is only one of the group of polysorbates, representing complex mixtures of polyoxyethyleneethers of mixed partial oilacid esters of sorbitolanhydrides.

Other suitable substances are polyglycols of the general type

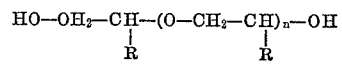

wherein $R=C_xH_{2x+1}(x=0$ to ... 10) and $n=2$ to ... 100,000.

One example of such a substance is polyethyleneglycol, where $R=H$ and $n=50$–$150$.

Still another kind of suitable substance consists of the alkanediols of the following types (a) $\alpha,\omega$-alkanediols of the type $$HO—CH_2—(CH_2)_n—CH_2OH$$

wherein $n=1$–$20$;

(b) 2,2'-dialkyl-1,3-propanediols of the type

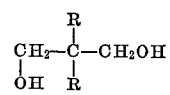

wherein $R=C_nH_{2n+1}$ and $n=0$–$10$;

(c) 3-alkyl-1,3-propanediols of the type

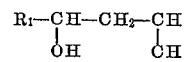

wherein $R_1=C_nH_{2n+1}$ and $n=1$–$10$.

Further, also the substance polyvinyl-2-pyrrolidone has been contemplated as a suitable one for rendering the said selected surface areas hydrophilic.

The above mentioned substances are applied to the plastic material of the slides in that the substances are dissolved or dispersed in either a medium (A) with great affinity to the plastic material, in which case the said substances will be fixedly bonded so that a permanent surface results, or in a medium (B) short of such affinity, in which latter case a superficial coating only is abtained. Examples of mediums of the first mentioned type (A) are mono-, di- and polyhalogene alkanes or alkenes, such as methylenechloride, chloroform and trans-1,2-dichlorethylene. Examples of mediums of the second type (B) are primary or secondary alkanoles, such as methanol and ethanol.

As to the concentration of the said substances it should be mentioned that satisfying results have been obtained with concentrations within the range of 0.25% to 10%. Particularly as far as the polysorbates are concerned good results have been obtained with concentrations within the range of 0.25%–2%, and an optimum would appear to lie in the range 0.25%–0.5%.

Naturally, a plurality of modifications and alterations as to details may be carried out within the scope of the invention idea.

I claim:

1. A slide for wet biological preparations comprising a plate consisting of plastic material and having an elongated recess therein for receiving the preparation and a hydrophilic coating on the surface of said recess, said hydrophilic coating consisting of a substance selected from the group consisting of: polysorbates; polyvinyl-2-pyrrolidone; polyglycols of the general type

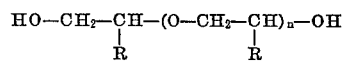

wherein $n=2$ to 100,000 and $R=C_xH_{2x+1}$, $x$ being 0 to

10; and alkanediols selected from the group consisting of:

(a) α,ω-alkanediols of the type $$HO-CH_2-(CH_2)_n-CH_2OH$$

wherein $n=1$ to 20;

(b) 2,2′-dialkyl-1,3-propanediols of the type

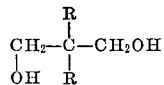

wherein $R=C_nH_{2n+1}$, $n$ being 0 to 10;

(c) 3-alkyl-1,3-propanediols of the type

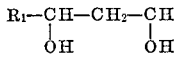

wherein $R_1=C_nH_{2n+1}$, $n$ being 1 to 10.

2. A slide as claimed in claim 1, wherein said substance has been applied as a solution, the solvent being selected from the group consisting of mono-, di- and polyhalogen alkanes and alkenes, and primary and secondary alkanoles.

3. A slide as claimed in claim 2, wherein the concentration of said substance in said solvent is 0.25 to 10 percent.

4. A slide as claimed in claim 1 wherein said substance is a polysorbate and has been applied as a solution, the solvent being selected from the group consisting of mono-, di- and polyhalogen alkanes and alkenes, and primary and secondary alkanoles, the concentration of said substance in said solution being 0.25 to 2 percent.

5. A slide as claimed in claim 4 wherein the concentration of said substance is 0.25 to 0.50 percent.

References Cited

UNITED STATES PATENTS

| | | | |
|---|---|---|---|
| 2,440,472 | 4/1948 | Horner et al. | 350—95 |
| 2,561,339 | 7/1951 | Chediak | 23—253 |
| 3,189,541 | 6/1965 | Brenner et al. | 23—259 |
| 3,227,522 | 1/1966 | Salisbury et al. | 23—253 |

FOREIGN PATENTS 886,652   4/1960   Great Britain.

OTHER REFERENCES

Aloe, labratory apparatus, equipment, reagents, catalog No. 103, pp. 649, 650, 793 (1952).

Schaar, selected labratory equipment, catalog No. 50, pp. 448, 457 (1950).

MORRIS O. WOLK, *Primary Examiner.*

E. A. KATZ, *Assistant Examiner.*

U.S. Cl. X.R.

350—95; 167—84.5

UNITED STATES PATENT OFFICE
CERTIFICATE OF CORRECTION

Patent No. 3,432,275                        March 11, 1969

Hans Peter Olof Unger

It is certified that error appears in the above identified patent and that said Letters Patent are hereby corrected as shown below:

Column 1, line 28, after "reference" insert -- had --. Column 3, line 40, after "concerned" insert a dash. Column 4, line 60, "preparing" should read -- preparating --. Column 6, line 11, "$OH_2$" should read -- $CH_2$ --; line 35, "CH" should read -- OH --.

Signed and sealed this 23rd day of February 1971.

(SEAL)
Attest:

Edward M. Fletcher, Jr.                       WILLIAM E. SCHUYLER, JR.
Attesting Officer                                   Commissioner of Patents